April 14, 1925.
H. T. MAITLAND
1,533,325
PROCESS OF REFINING MINERAL OIL
Filed Dec. 4, 1920
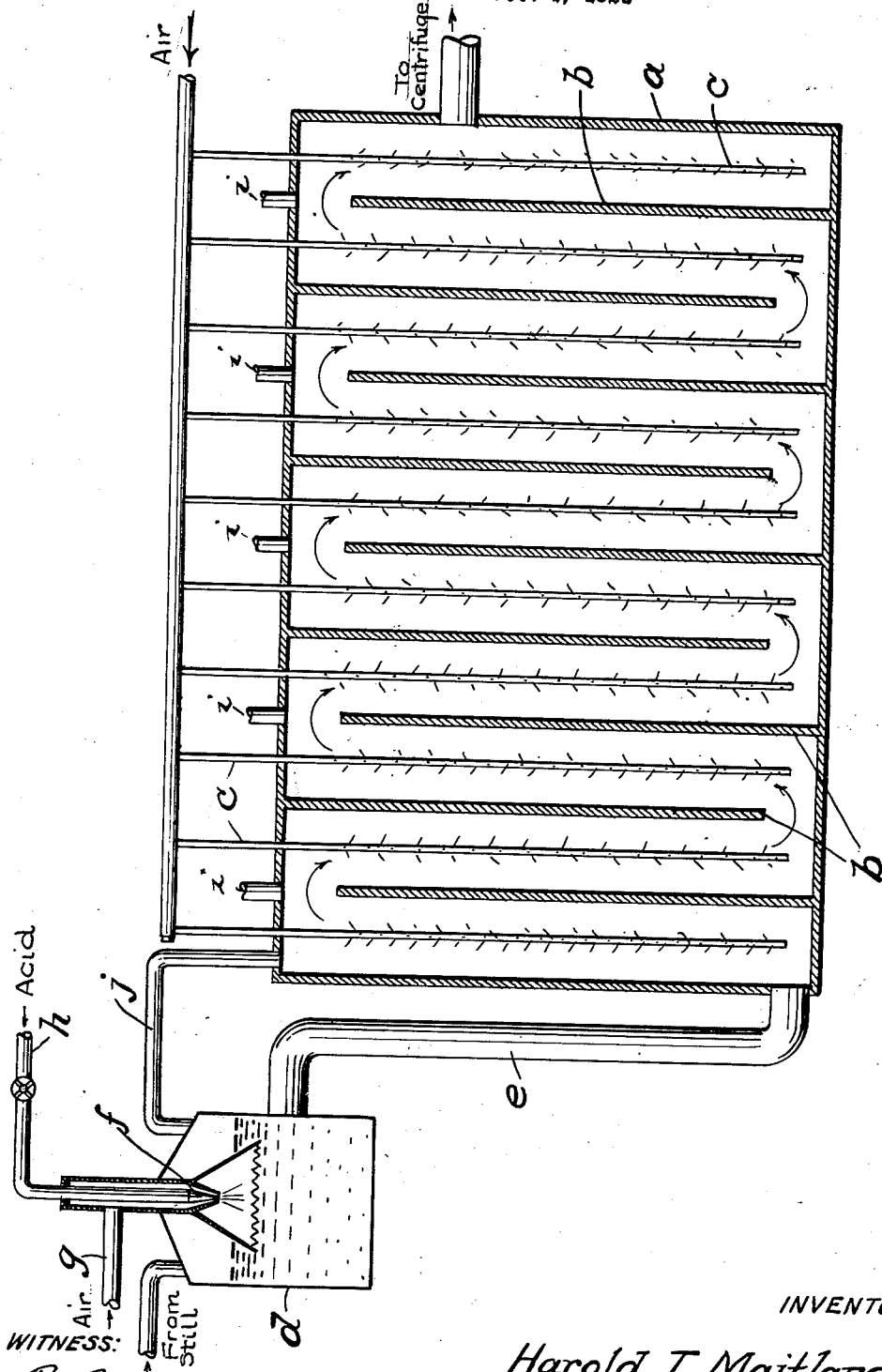
INVENTOR
Harold T. Maitland
BY Frank J. Busser
ATTORNEY.

Patented Apr. 14, 1925.

1,533,325

UNITED STATES PATENT OFFICE.

HAROLD T. MAITLAND, OF SHARON HILL, PENNSYLVANIA, ASSIGNOR TO SUN OIL COMPANY, OF PHILADELPHIA, PENNSYLVANIA, A CORPORATION OF NEW JERSEY.

PROCESS OF REFINING MINERAL OIL.

Application filed December 4, 1920. Serial No. 428,197.

*To all whom it may concern:*

Be it known that I, HAROLD T. MAITLAND, a citizen of the United States, residing at Sharon Hill, county of Delaware, and State of Pennsylvania, have invented a new and useful Improvement in Processes of Refining Mineral Oil, of which the following is a full, clear, and exact description, reference being had to the accompanying drawings, which form a part of this specification.

In the refining of petroleum products, it is customary to run the lubricating stock into an agitator, and, while subjecting it to agitation, treat it with sulfuric acid, which combines with certain hydrocarbons and other compounds whose removal is necessary to secure greater purity and better color. The acid-treated stock is allowed to stand for a considerable period, the larger particles of the combined acid hydrocarbons and compounds settling to the bottom of the tank, forming an acid sludge, which is drawn off, but the small particles remain suspended in the stock. The stock is then treated with an alkali to neutralize the acid not carried off with the sludge and washed with water to eliminate it, as fully as possible, from the oil.

This treatment is not wholly satisfactory, particularly as applied to the refining of the heavier distillates and reduced distillates, such as those adapted for lubricating purposes. After agitation of lubricating stock with acid, the immediate effect of the sulfuric acid and its products of dissociation, chiefly sulfur dioxid ($So_2$) is to darken the oil. The longer the period of settlement (and settlement for a prolonged period is required to allow the larger particles of acid compounds to settle out), the greater the discoloration. The smaller particles of acid compounds which do not settle out as above explained, are redissolved into the oil by the neutralized process, lowering the color of the finished oil.

The object of my invention is to reduce to a minimum the period during which the stock is subjected to the action of the acid.

Another object of the invention is to expedite the process, to effect a more thorough acidifying of the stock, and to remove the sludge in a continuous manner instead of treating a large body of stock at one time and removing at one time all the sludge formed in such body.

Another object of the invention is to so treat the material, during distillation of the crude petroleum as well as subsequently, as to avoid the production of polymerized or oxidized products which, when treated with a strong acid, tend to be carbonized, thus freeing carbon and "coking" the sludge. My object is to avoid this "coking" of the sludge and also to avoid "granulation," so that when it forms it will be a freely flowing liquid that is susceptible of being successfully removed by the continuous process hereinbefore mentioned.

Inasmuch as precautions must be taken, as hereinbefore stated, to avoid the production of certain polymerized or oxidized products that are incidental to distillation at high temperature, as ordinarily practiced, I shall briefly describe the entire refining process, as I prefer to practice it, as applied to the production and refining of lubricating oil.

Starting (say) with Texas crude petroleum, it is important that the temperature of the first distillation shall not exceed approximately 700° F. At this temperature an asphaltic residuum will remain in the still. In condensing the distillate the condenser should be adjusted so that a quick condensation of the hot vapors will take place. The oil flowing from the condensers should be maintained at a temperature in the neighborhood of 70° F.

In redistillation (which is usually necessary in the manufacture of lubricating oil), similar precautions should be taken. The maximum temperature permissible should not exceed 500 or 600° F. The distillates driven off are gas oils and the lighter lubricating distillates. The residuum is the lubricating stock to which my invention is more particularly applicable, although it is not limited thereto. The residuum should be cooled quickly, preferably by forcing steam through the still until the temperature is reduced to a point somewhat in excess of 212° F. Condensation of moisture in the stock should be avoided. The stock is then pumped out through cooling coils submerged in water. It should be cooled to a temperature of 65–75° F. before introduction into the agitators for treatment.

The stock should be tested to ascertain whether it is free from moisture. If it is not, it should be treated preliminarily with just sufficient sulfuric acid to dehydrate. The water acid is then settled and removed.

If the above operations are conducted in accordance with the description, the stock will be free from the oxidized or polymerized products hereinbefore mentioned and also free from water. The presence of such oxidized products causes formation in the sludge of free carbon, as hereinbefore explained. The presence of water tends to granulate the sludge. Either of these conditions would result in the formation of sludge having physical characteristics such as would defeat or obstruct the successful practice of my process, the concluding step of which requires the sludge to have the consistence of a freely flowing liquid.

Before subjecting the oil stock to the acid treatment I prefer to treat it with air, as by introducing and mixing air in minute bubbles in the body of oil, thereby producing a foamy body of oil comprising small globules of air holding in the spaces between them minute bodies of oil. I have found that by the introduction of acid into a body of oil that has been brought into a foamy condition by treatment with air before the introduction of the acid, the latter will distribute itself over the outer surfaces of the air globules, or oil film, without impenetration and thus act on a much greater surface of oil than if applied to a body of oil with or without simultaneous air agitation; thereby much reducing the amount of acid required to treat a given body of oil and insuring an oil that may be more easily centrifuged to a low acidity. This step of my process is decidedly advantageous and therefore preferential, but it is not indispensable to the practice of the process. By the use of considerably more acid (although not more than that customarily used), my process may be successfully practiced without foaming the oil stock.

Instead of running the oil stock into a large agitator (the capacity of the usual agitator is about 2300 barrels) I run it continuously into a tank or agitator of comparatively small volume and allow it to continuously overflow therefrom. Preferably I use a tank provided with staggered partitions, so as to provide a circuitous course for the oil from an inlet at one end to an overflow outlet at the other end. Within a chamber or pipe through which the oil flows to the tank I place a spraying device, from which the acid is sprayed into the oil after it has been foamed and as the oil is flowing toward the tank. Within the tank, and between the staggered partitions, is placed a series of perforated pipes through which air is introduced, thereby agitating the oil as it flows through the tank to insure the action of the acid upon every particle of oil. The acid is preferably oil of vitriol of about 93.5 per cent sulfuric acid. Slightly weaker oil of vitriol is usable. Stronger acid is not commercially economical.

The acid-treated oil flowing from the tank is conducted to suitable centrifuges, wherein the acid sludge is separated from the oil by centrifugal force.

The capacity of the tank depends upon several factors, but chiefly upon the rate of flow. It is desirable that the acid should be allowed to act upon the oil for a comparatively short period of time, say one-half hour, which is about the period of the combined acid and agitation treatment in known regular commercial processes. In such oil processes, however, the large body of stock treated must be allowed to stand a long time before the sludge is precipitated by gravity. In my process, however, when the stock has been thoroughly acidified, it may be, and preferably is, immediately withdrawn from the tank. It will thus be understood that the greater the rate of flow through the tank, the greater the necessary capacity of the tank, while the smaller the rate of flow, the smaller the necessary capacity of the tank. This rate of flow will, in turn, be determined by the capacity of the centrifuges. The greater the capacity of the centrifuges, the more rapid the rate of flow from and through the tank.

It will thus be seen that the rapidity of the process depends upon the capacity of the centrifuges, and that with a given capacity of the centrifuges, the size of the tank may be adjusted to give any desired duration to the acidifying treatment.

By the avoidance of contact between the acid and oil stock for a longer period of time than is required to allow the acid to combine with the hydrocarbons and other compounds whose removal is desired, discoloration of the oil is avoided, the process is capable of being expedited, and a cleaner and more thorough separation of the oil from the sludge and decomposition or reaction products is effected.

It is impossible to successfully centrifuge ordinary acid-treated lubricating oil stock because the sludge, when centrifugally separated, is not of proper consistency to be carried out of the centrifuge. Besides containing carbonized products, it is partially granulated to the extent that the stock contains condensed moisture. Sludge having such physical characteristics is not properly carried out of the centrifuge, as it adheres to the bowl wall and clogs the passages. In my process the oil fed to the centrifuge separates into an inner zone of light oil and an outer zone of heavy but completely liquid and freely flowing sludge, which does not adhere to the bowl wall and outflows freely. The two constituents are of such substantially different specific gravities that a clean and rapid separation is practicable. The oil outflowing from the centrifuge is entirely free from the discoloration produced, in the regular commercial process, by the action of the acid thereon during settlement.

The figure of the drawing is a diagram, in elevation, of a suitable acid tank.

The tank $a$, by means of staggered wings $b$, compels the oil stock to flow through the tank in a circuitous course. The perforated pipes $c$ are for the purpose of introducing air under pressure to effect agitation of the oil stock during the acid treatment. The stock to be treated flows into a chamber $d$ and thence, through a pipe $e$, to the tank $a$. Acid is introduced into the body of oil in the chamber through an injector $f$, communicating with an air supply pipe $g$ and an acid supply pipe $h$. The tank $a$ is provided with air vents $i$ and an air vent pipe $j$ connects chamber $d$ and tank $a$. From the outflow $f$ the acid-treated oil passes to the centrifuges.

Having now fully described my invention, what I claim and desire to protect by Letters Patent is:—

1. The process of continuously refining hydrocarbon oil by subjecting stock that is devoid of substantial quantities of oxidized or polymerized products and that is substantially free of water to the action of sulfuric acid without settlement, establishing a continuously flowing stream of mixed oil and acid and during said flow agitating the mixed oil and acid with air, and at the end of said stream and without allowing substantial settlement and before substantial discoloration of the oil, continuously separating the oil and acid sludge by centrifugal force and separately continuously outflowing the oil and acid sludge.

2. The process of producing refining oil which comprises so distilling and treating the crude petroleum as to produce a stock substantially devoid of oxidized or polymerized products, subjecting said stock to the action of sulfuric acid without settlement, establishing a continuously flowing stream of mixed oil and acid and during said flow agitating the mixed oil and acid with air, and at the end of said stream and without allowing substantial settlement and before substantial discoloration of the oil, continuously separating the oil and acid sludge by centrifugal force and separately continuously outflowing the oil and acid sludge.

In testimony of which invention, I have hereunto set my hand, at Marcus Hook, Pa., on this 30th day of November, 1920.

HAROLD T. MAITLAND.